United States Patent [19]
Tatsuta et al.

[11] Patent Number: 6,131,616
[45] Date of Patent: Oct. 17, 2000

[54] CORRUGATED SYNTHETIC RESIN PIPE

[75] Inventors: Yoshiaki Tatsuta; Kazuya Yamashita; Takeshi Mochizuki; Kazumasa Nakayama, all of Osaka, Japan

[73] Assignee: Totaku Industries, Inc., Osaka, Japan

[21] Appl. No.: 09/326,690

[22] Filed: Jun. 7, 1999

[30]  Foreign Application Priority Data

Jun. 8, 1998 [JP] Japan .................................. 10-176599

[51] Int. Cl.[7] ................................................... F16L 11/11
[52] U.S. Cl. ........................ 138/121; 138/110; 138/155; 138/156; 138/177
[58] Field of Search .................................. 138/110, 121, 138/119, 156, DIG. 11, 120, 122, 177

[56]  References Cited

U.S. PATENT DOCUMENTS

| | | | |
|---|---|---|---|
| 3,559,692 | 2/1971 | Mantelet | 138/121 |
| 3,838,713 | 10/1974 | Tubbs | 138/121 |
| 4,360,104 | 11/1982 | Lang | 138/121 |
| 5,704,401 | 1/1998 | Fukui et al. | 138/121 |
| 5,799,703 | 9/1998 | Kanao et al. | 138/121 |
| 5,813,701 | 9/1998 | Noble | 138/119 |
| 5,832,960 | 11/1998 | Amatsutsu et al. | 138/121 |
| 5,839,477 | 11/1998 | Murayama | 138/121 |
| 5,971,033 | 10/1999 | Lanz | 138/121 |
| 6,024,130 | 2/2000 | Tatsuta et al. | 138/121 |

*Primary Examiner*—James Hook
*Attorney, Agent, or Firm*—McGuireWoods, LLP

[57] ABSTRACT

A corrugated synthetic resin pipe comprises a pipe wall including sectionally rectangular wall portions and sectionally circular wall portions disposed alternately in a longitudinal direction of the pipe. Each of the sectionally circular wall portions has an annular projected portion disposed at a substantially center of the sectionally circular wall portion between adjacent sectionally rectangular wall portions in the longitudinal direction, to thereby prevent parallel layout or stack layout of pipes from being disturbed.

17 Claims, 11 Drawing Sheets

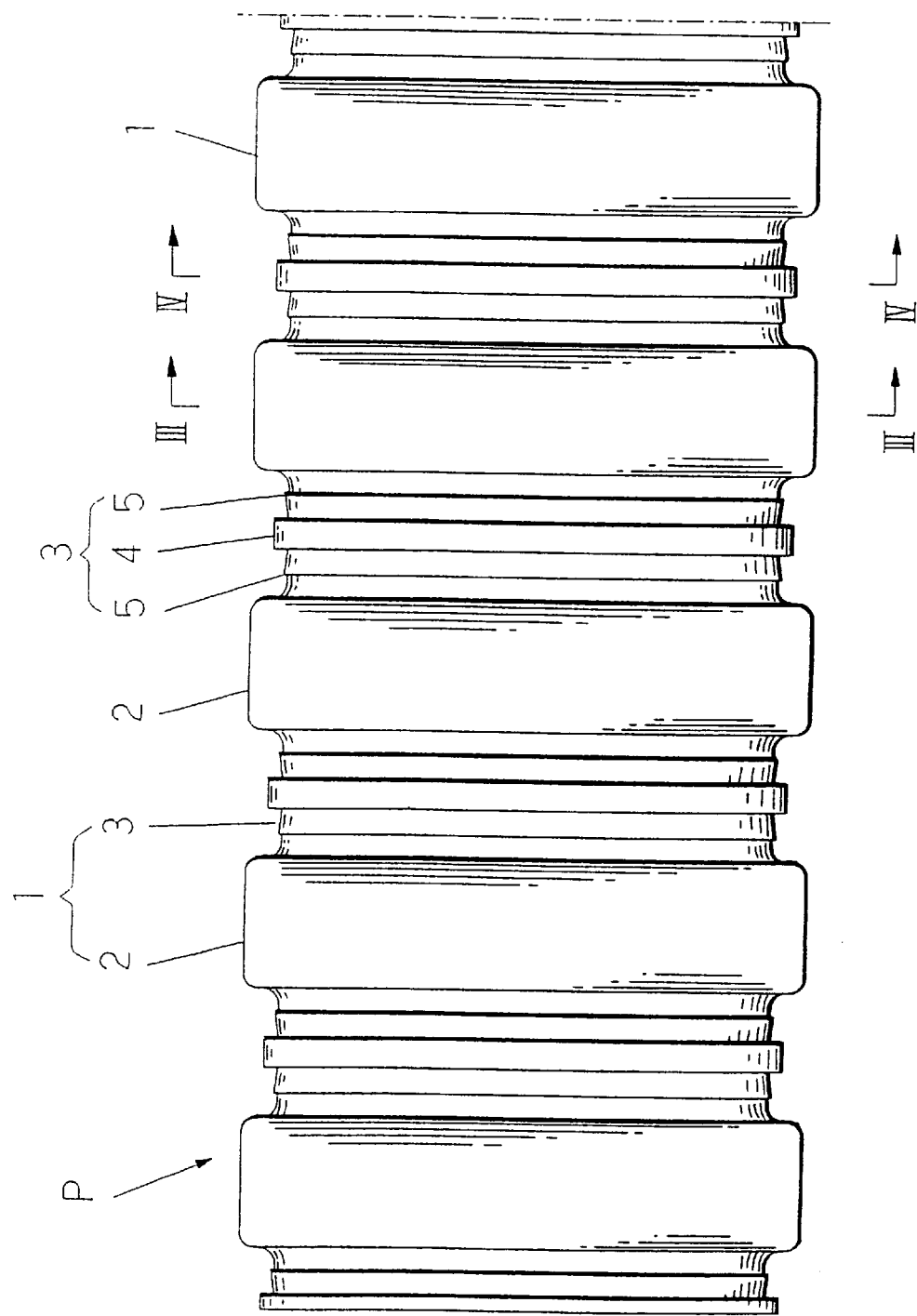

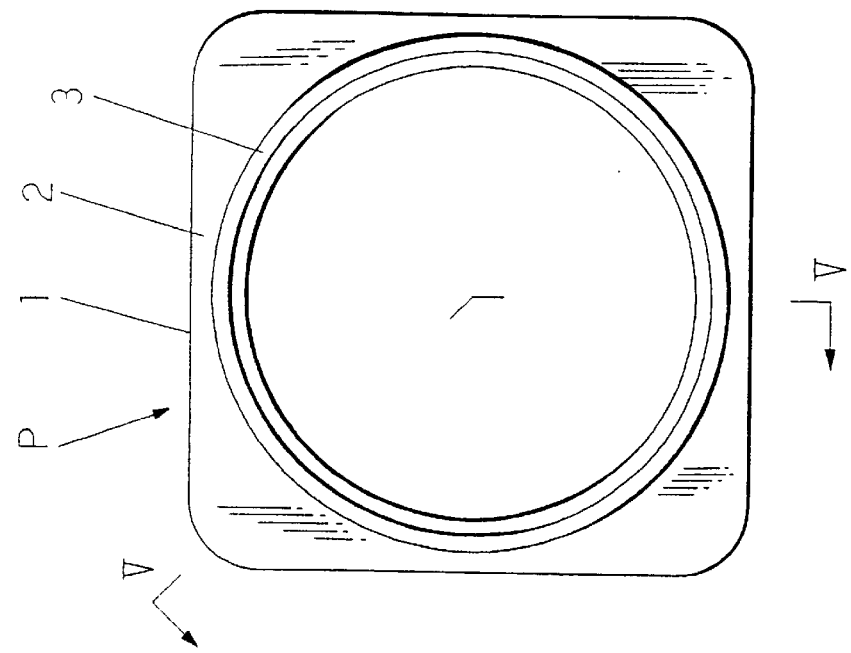
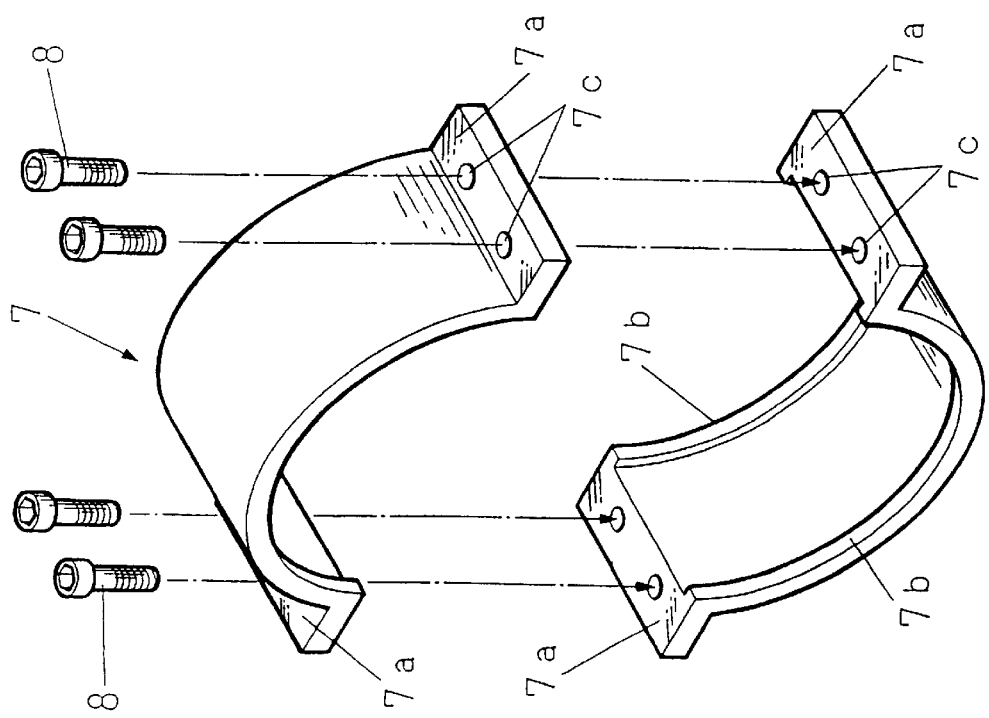

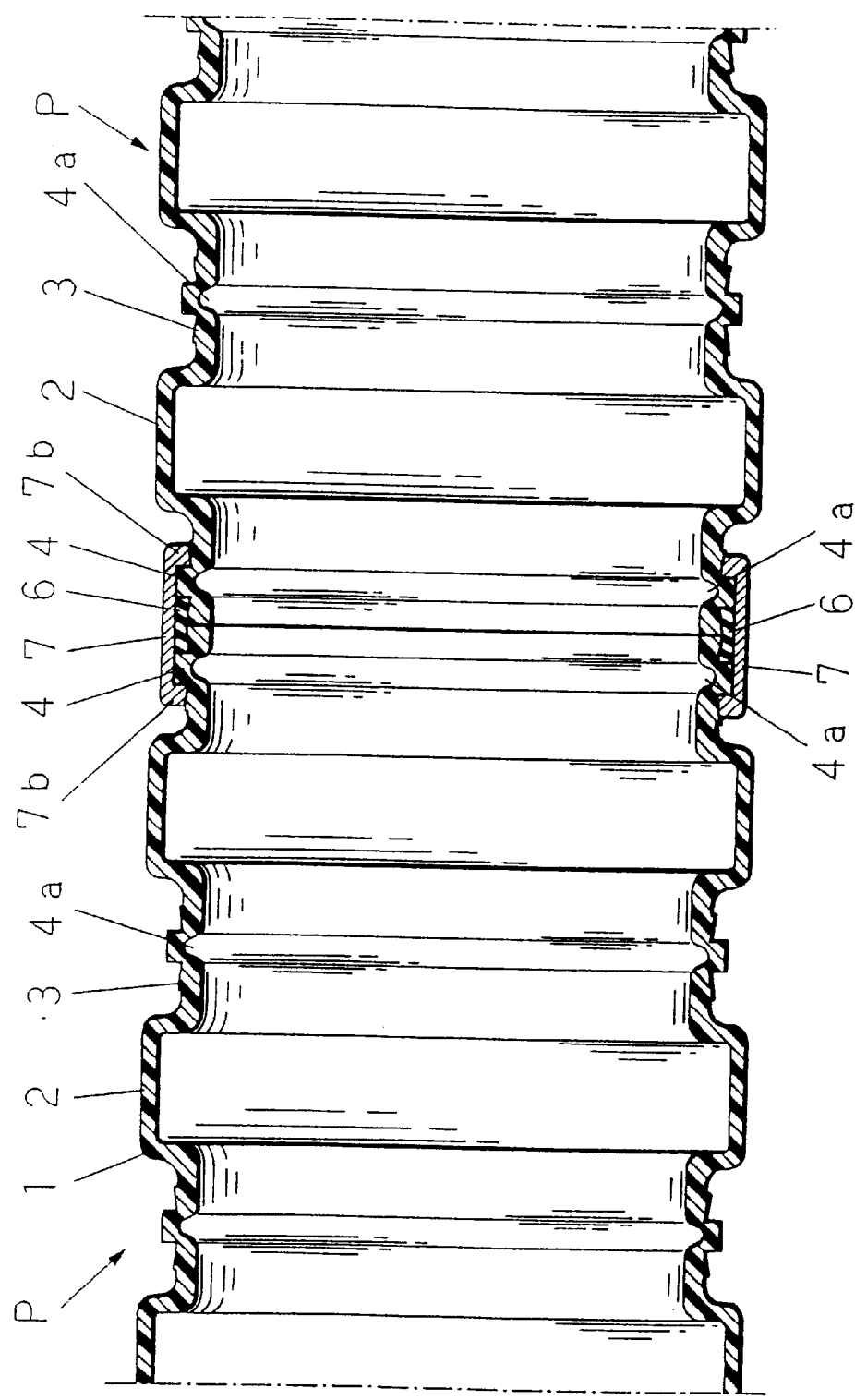

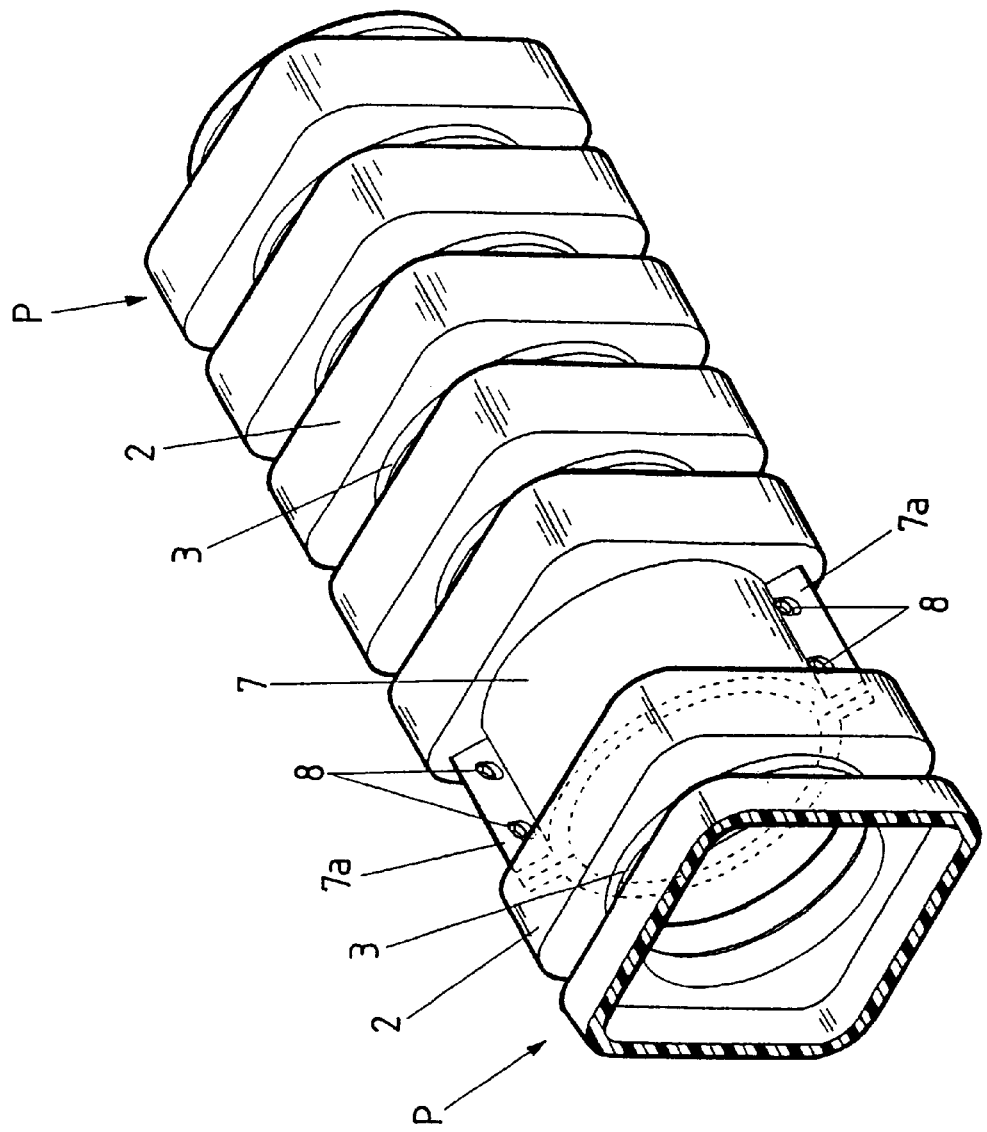

CORRUGATED SYNTHETIC RESIN PIPE

BACKGROUND OF THE INVENTION

1. Field of the Invention

The present invention relates to a corrugated synthetic resin pipe which is to be buried in the ground or laid inside and outside a building on the ground or outdoors under a bridge, an elevated road, or the like, and which is used mainly for insertion of a cable, therethrough, such as an electric cable, a telephone cable, an optical cable, etc., the cable is protected by the pipe.

2. Background Art

Heretofore, generally, synthetic resin pipes each having a pipe wall shaped like an annularly or helically corrugated configuration are known widely. The pipes of this type have been already used as water pipes or sewage pipes. Further, the pipes of this type have begun to be used widely also as pipes for protecting cables such as telephone cables, etc. In any case of the conventional synthetic resin pipe whether the pipe is an annularly corrugated one or a helically corrugated one, all over the full length of the pipe has a substantially circular cross-section taken along a radial direction of the pipe and also has an corrugated cross section taken along the longitudinal direction of the pipe (hereinafter simply referring a circular-unevenly shape).

Because the conventional synthetic resin pipe is corrugate-shaped all over the full length of the pipe as described above, the pipe is apt to rotate circumferentially with poor stability when the pipe is to be laid. Accordingly, when a plurality of conventional pipes are to be laid in parallel with each other, the pipes are hardly kept parallel. Particularly when the conventional pipes are to be buried in the ground, earth and sand enter between the pipes so that the pipes move in a radial direction thereof. Accordingly, there is a problem that the straightness of pipe layout is apt to be disturbed. If predetermined straight pipe layout cannot be achieved, water stream resistance in the pipes increases more than that is required in the case where the pipes are used as water pipes or sewage pipes. If predetermined straight pipe layout cannot be achieved, frictional resistance in the work of inserting cables, or the like, into the pipes increases more than that is required in the case where the pipes are used as cable protective pipes. Accordingly, there is a problem that workability is lowered.

Therefore, a Japanese Patent Unexamined Publication No. Hei. 8-21933 had paid attention to the problems in such conventional circular corrugated pipes and had previously developed a synthetic resin pipe P as a pipe having a novel structure to solve these problems in the conventional pipes. That is, as shown in FIGS. 16 and 17, the publication discloses that the synthetic resin pipe P has a pipe wall 1 formed by alternatively arranging sectionally square wall portions 2 and sectionally circular wall portions 3 in the longitudinal direction of the pipe, in such a manner that the presence of the sectionally square wall portions 2 prevents the pipe from rotating in a circumferential direction thereof or moving in a radial direction thereof recklessly.

On the other hand, the previously developed pipe P was designed such that a sectionally circular wall portion formed as a portion between adjacent sectionally square wall portions was shaped in a simple cylinder. Accordingly, when the circular wall portions were used for connecting ends of pipes to each other, it was difficult to connect the pipe ends to each other watertightly. Further, even in the case where pull-apart external force acted in the longitudinal direction of the pipes, it was difficult to achieve secure connection to keep the pipes watertight against the external force. On the other hand, when the sectionally square wall portions were used for connecting ends of pipes, the joint portion became large so that the joint portion was projected largely over the outer circumference of the pipes.

Accordingly, it was difficult to perform parallel pipe laying out, stack pipe layout, or serial pipe layout in an ordinary state. In that situation, it could not be said that such connection was desirable.

SUMMARY OF THE INVENTION

It is therefore an object of the present invention to solve the above-mentioned conventional problem. In particularly, it is an object of the present invention to provide a corrugated synthetic resin pipe not only capable of preventing the pipe from rotating in a circumferential direction thereof recklessly but also capable of watertightly connecting the ends of the pipes while preventing parallel layout or stack layout of pipes from being disturbed and also suppressing an increase of increase of the size of a joint portion between the piped.

The object can be achieved by a corrugated synthetic resin pipe comprising:

a pipe wall including sectionally rectangular wall portions and sectionally circular wall portions disposed alternately in a longitudinal direction of the pipe, wherein each of the sectionally circular wall portions has an annular projected portion disposed at a substantially center of the sectionally circular wall portion between adjacent sectionally rectangular wall portions in the longitudinal direction.

In the above-mentioned construction, it is preferable that the annular projected portion has a U-shaped cross-section taken along the longitudinal direction.

In the above-mentioned construction, it is more preferable that each of the sectionally circular wall portions further has an annular shaped cutting mark interposed between the annular projected portion and the sectionally rectangular wall portion, the annular shaped cutting mark being separated away from the annular projected portion by a predetermined distance in the longitudinal direction.

In the above-mentioned construction, it is further more preferable that a pair of the annular cutting marks are formed between the adjacent sectionally rectangular wall portions in the longitudinal direction.

In addition, in the above-mentioned construction, it is advantageous that the annular projected portion has a length in the longitudinal direction which lies in a range from one third to one sixth as large as a length of the sectionally circular wall portion in the longitudinal direction.

Further, in the above-mentioned construction, it is advantageous that a rectangular shape in a cross-section of each of the sectionally rectangular wall portions has rounded corners.

Furthermore, in the above-mentioned construction, it is advantageous that a rectangular shape in a cross-section of each of the sectionally rectangular wall portions is square.

Moreover, in the above-mentioned construction, it is preferable that a circular shape in cross-section of each of the sectionally circular wall portions is selected from the group consisting of a circle, an ellipse, an oblong and an egg-shape.

Still furthermore, in the above-mentioned construction, it is preferable that the annular shaped cutting mark comprises a tapered portion inclined relative to an axis of the pipe.

Preferably, in the above corrugated synthetic resin pipe, a synthetic resin material for the pipe wall is selected from polyolefin resin including polyethylene, polypropylene, etc.; polyvinyl chloride resin; and so on. If necessary, natural rubber, synthetic rubber, or the like, may be used in place of the synthetic resin material. Particularly in the case of pipes to be buried in the ground, the pipe wall is preferably formed of a synthetic resin material which is excellent both in water resistance and in pressure resistance.

BRIEF DESCRIPTION OF THE DRAWINGS

FIG. 1 is a front view of a pipe according to an embodiment of the present invention;

FIG. 2 is a side view of the pipe;

FIG. 7 is a cross-sectional view showing a state in which two pipes are butt-jointed to each other;

FIG. 8 is a perspective view showing a pipe joint;

FIG. 9 is a perspective view showing a state of connection of two pipes;

DESCRIPTION OF THE PREFERRED EMBODIMENTS

Figure 3:
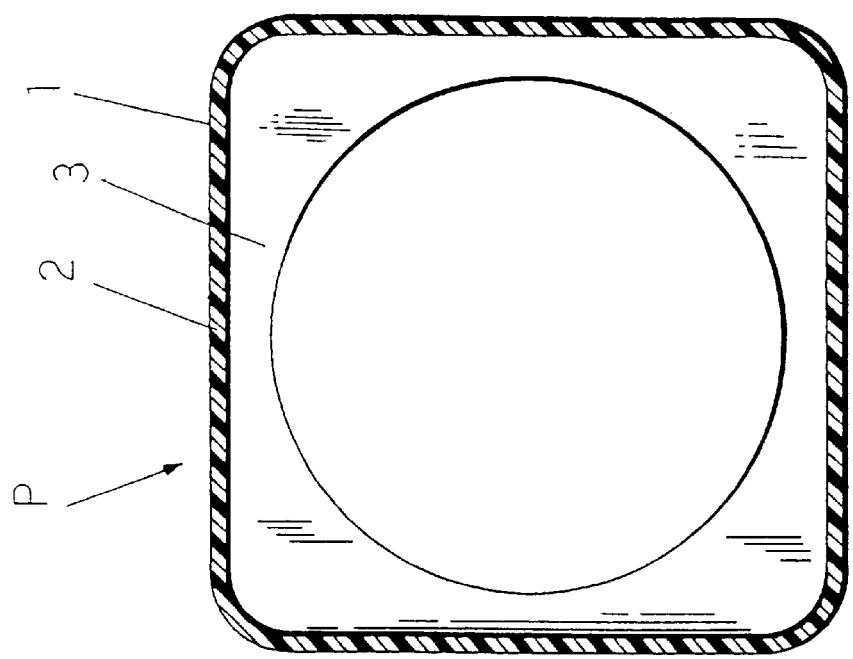
FIG. 3 is a cross-sectional view taken along the line III—III in FIG. 1.
Figure 4:
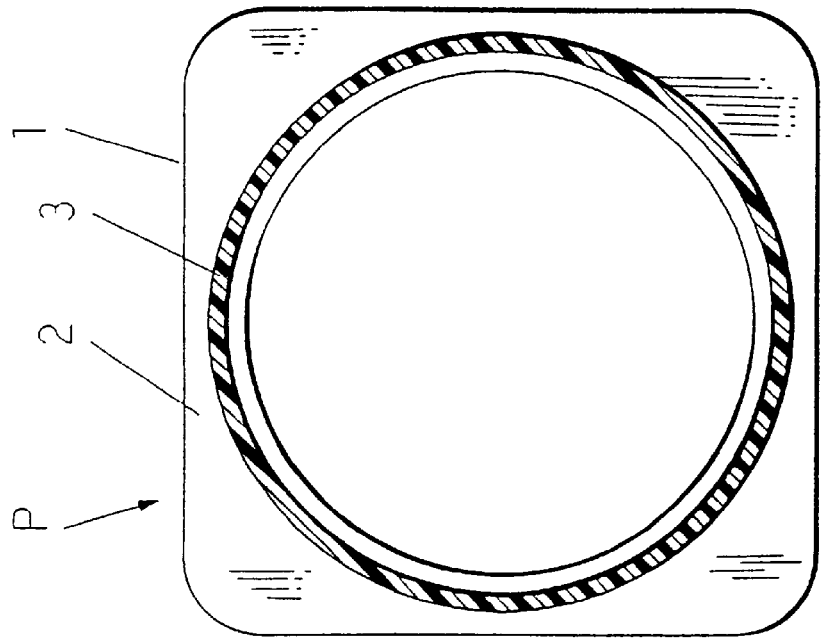
FIG. 4 is across-sectional view taken along the Line IV—IV in FIG. 1.
Figure 5:
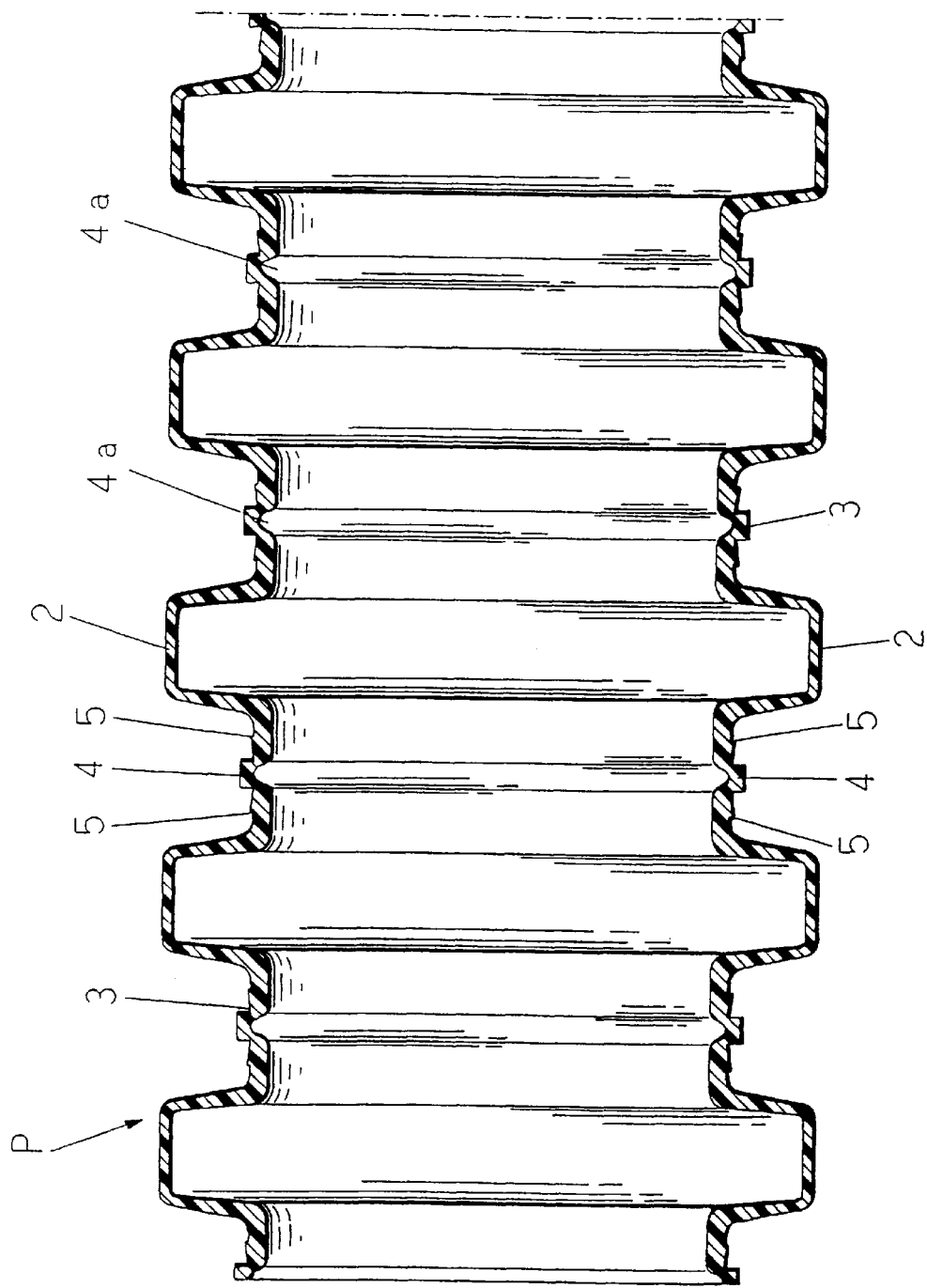
FIG. 5 is a longitudinally sectional view taken along the line V—V in FIG. 2.

Embodiments of the present invention will be described below with reference to accompanying drawings. FIGS. 1 to 5 show a pipe according to a first embodiment of the present invention. FIG. 1 is a view showing the external form of a pipe P. FIG. 2 is a view showing the side form of a pipe wall. FIGS. 3 and 4 are cross-sectional views of the pipe wall portion cut crosswise. FIG. 5 is a longitudinally sectional view of the pipe wall portion cut longitudinally along the arrows V—V shown in FIG. 2.

The pipe P shown in this embodiment is a typical example of a pipe formed by a blow molding means of a generally-known caterpillar type. As shown in FIGS. 1 and 2, the pipe P has a plurality of pipe wall portions 1 sequentially connected in the longitudinal direction. Each pipe wall portion 1 is formed of a square wall portion 2 and a circular wall portion 3. The square wall portion 2 is shaped like a square in cross-section having rounded corners. The circular wall portion 3 is shaped substantially like a circle in cross-section. The square wall portion 2 and the circular wall portion 3 are arranged alternately continuously in the longitudinal direction of the pipe P. Further, the pipe wall portion 1 is formed so that the external diameter of the circular wall portion 3 is smaller than the external size of each of the four sides of the square wall portion 2.

Further, each circular wall portion is formed so as to project in a longitudinally center portion of the circular wall portion 3 and so as to have a longitudinal length of ¼–⅕ of the longitudinal length of the circular wall portion 3 so that the annular protrusion 4 has a U-shaped edge in longitudinal section and an arc groove 4a inside the U-shape edge also in longitudinal section (FIG. 5). On opposite sides of the annular protrusion 4, inclined surfaces are formed so as to rise outward with slight slopes from opposite-side base portions of the annular protrusion 4 so that annular step portions are formed substantially in intermediate positions between the opposite-side base portions of the annular protrusion 4 and side walls of two adjacent square wall portions 2. The annular step portions are provided as a pair of annular cutting marks 5 and 5.

The pipe P having the aforementioned structure are produced as follows. Molten resin is extruded continuously from a resin extruder disposed at one end of a continuous molding mold in a known catapillar type pipe molder as described above, so that the extruded molten resin forms a tube in the continuous molding mold. High-pressure air is blown into the tube, or air is sucked from the molding mold simultaneously with the blowing of the high-pressure air into the tube so that the catapillar type molding mold is moved forward sequentially while the tube in a molten state is pressed against the molding mold. Thus, it is possible to mold or produce the pipe P. In this case, when the annular protrusions 4 each having a U-shaped edge in longitudinal section are formed so as to project, grooves 4a each having a circular arc also in longitudinal section are formed in the inside of the annular protrusions 4, as shown in the drawings.

Figure 6:
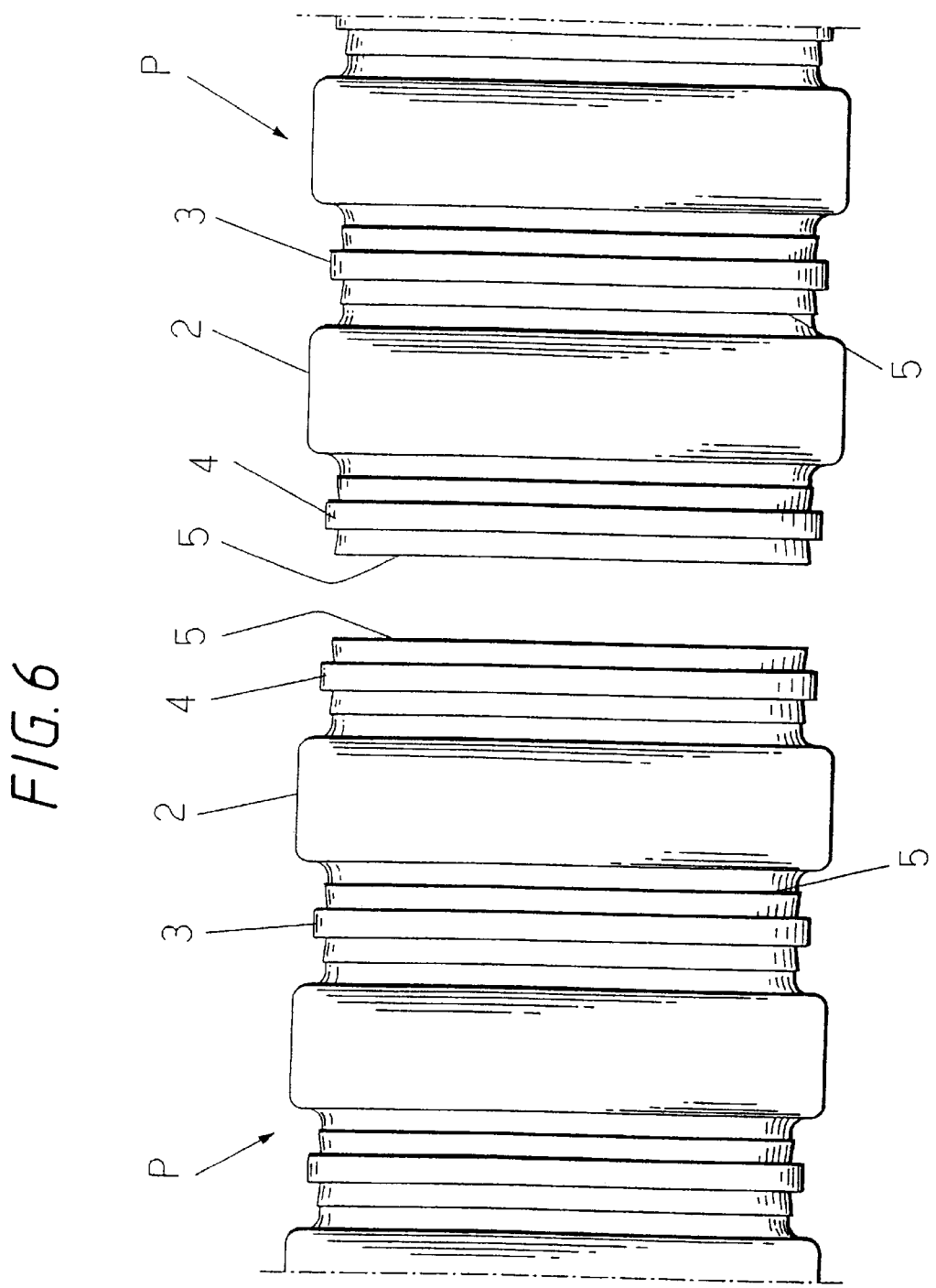
FIG. 6 is a front view showing a state in which cut ends of two pipes are made face to face.

FIGS. 6 to 9 show a connection means using a pipe joint for connecting two pipes produced in the aforementioned manner. As shown in FIG. 6, two pipes P, P to be connected to each other are cut along the annular cutting marks 5 on the pipe end side in the sectionally circular wall portions 3 respectively and the pipe ends cut thus are made face to face. The pipe ends are then brought into contact with each other. A seal packing 6 is outer-fitted between the contact surfaces of the pipes P or onto the outer circumference of the contact surface portion. Alternatively, a belt-like packing is wound on the outer circumferential portion of the contact surface portion. Then, the outer circumferential portion of the contact surface portion is fixedly tightened by a two-part type pipe joint 7 shown in FIG. 8.

The pipe joint 7 is composed of two parts each shaped like a half circle. Each of the two parts has a pair of connections 7a, 7a projected outward from opposite ends of the half-circular part, a pair of ribs 7b, 7b projected inward from opposite sides of the half-circular part in the longitudinal direction, and bolt through-holes 7c formed in the connections 7a, 7a. As shown in FIG. 7, the ribs 7b, 7b on the opposite sides are brought into contact with the outer surfaces of annular protrusions 4, 4 located on opposite sides of the pipe end portion to hold the annular protrusions 4, 4 tightly to thereby prevent the pipes P, P from moving outward in the longitudinal direction. Further, as shown in FIG. 9, while the two-part contact surfaces of the pipe joint 7 are phase-shifted or rotated by about 45° from the horizontal positions so that the connections 7a, 7a have a posture along a diagonal line in the square wall portions 2 of the pipes P, the connections 7a, 7a are fixedly tightened by bolts 8 . . . In this manner, not only the half-circular parts but also the connections 7a, 7a of the pipe joint 7 are prevented from being projected from the outer circumferential surfaces of the square wall portions 2 of the pipes P. That is, the pipe joint 7 can be used in the condition in which the pipe joint 7 is entirely housed in a virtual space of the outer circumferential surfaces of the square wall portions 2.

Figure 10:
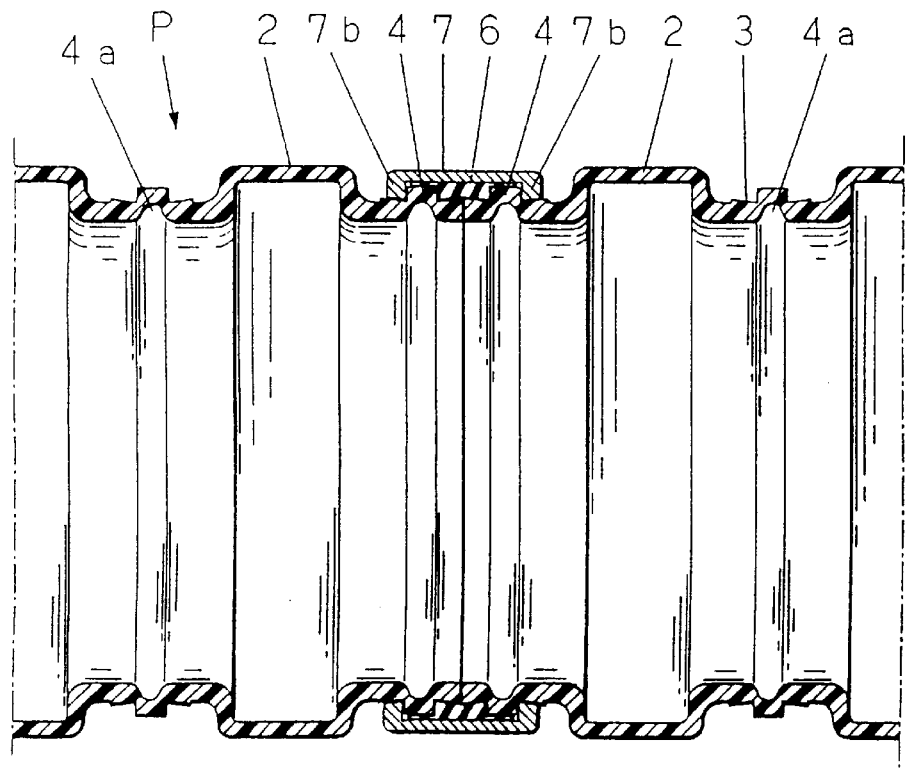
FIG. 10 is a cross-sectional view of another connection means in the equivalent portion to FIG. 7.
Figure 11:
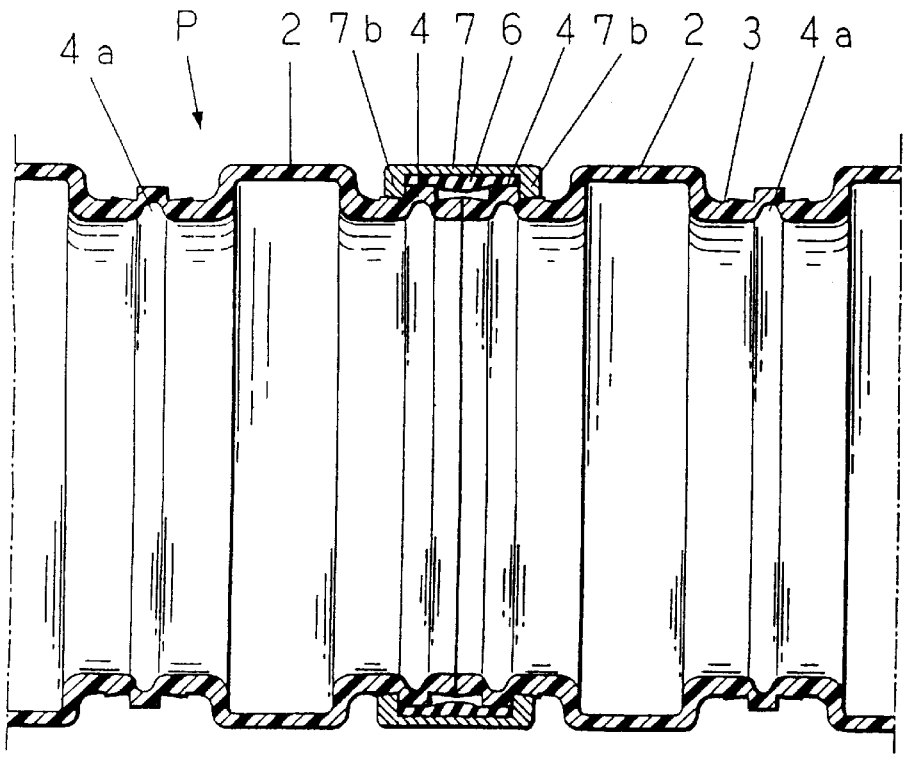
FIG. 11 is a cross-sectional view of a further connection means in the equivalent portion to FIG. 7.

FIGS. 10 and 11 show other connection means respectively by use of pipes P shown in the aforementioned embodiment. In the connection means shown in FIG. 10, a packing 6 having a T-shape in section is used. The center portion of the T-shaped packing 6 is disposed on the pipe ends. The left and right laterally projected portions of the T-shaped packing 6 are outer-fitted or wound on the left and right annular protrusions 4 so that the outer circumferences of the annular protrusions 4 are covered with the laterally projected portions of the T-shaped packing 6. A pipe joint 7 having two half-circular parts as described above is then brought into contact with the outer surfaces of the annular protrusions 4 and outer-fitted to the outer circumference of the packing 6 so that these two pipes P, P are prevented from moving in disconnecting directions. In the connection means shown in FIG. 11, a flat-belt-like packing 6 is used. The packing 6 is outer-fitted or wound on two annular protrusions 4, 4 at the pipe ends so that a portion between the annular protrusions 4, 4 and the outer circumferences of the annular protrusions 4, 4 are covered with the packing 6. The outer circumference of the packing 6 is fixedly tightened by a pipe joint 7 having two half-circular parts. Also in this embodiment, the ribs 7b, 7b on respective opposite sides of the two half-circular parts of the pipe joint 7 are engaged with side surfaces of the annular protrusions 4, 4 in the same manner as that in the aforementioned embodiment so that the pipes P, P are prevented from moving in disconnecting directions.

Figure 12:
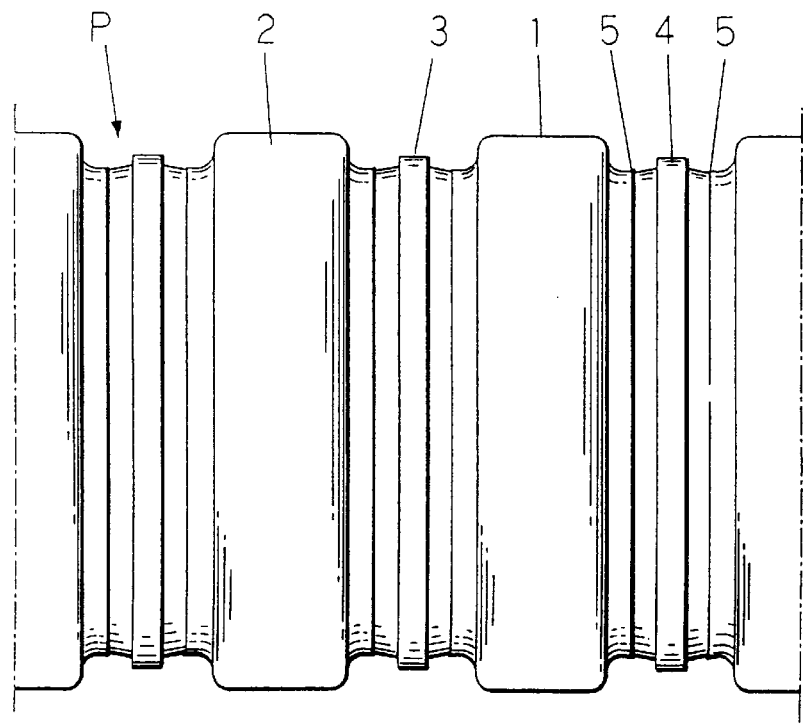
FIG. 12 is a front view showing a pipe according to another embodiment of the present invention.
Figure 13:
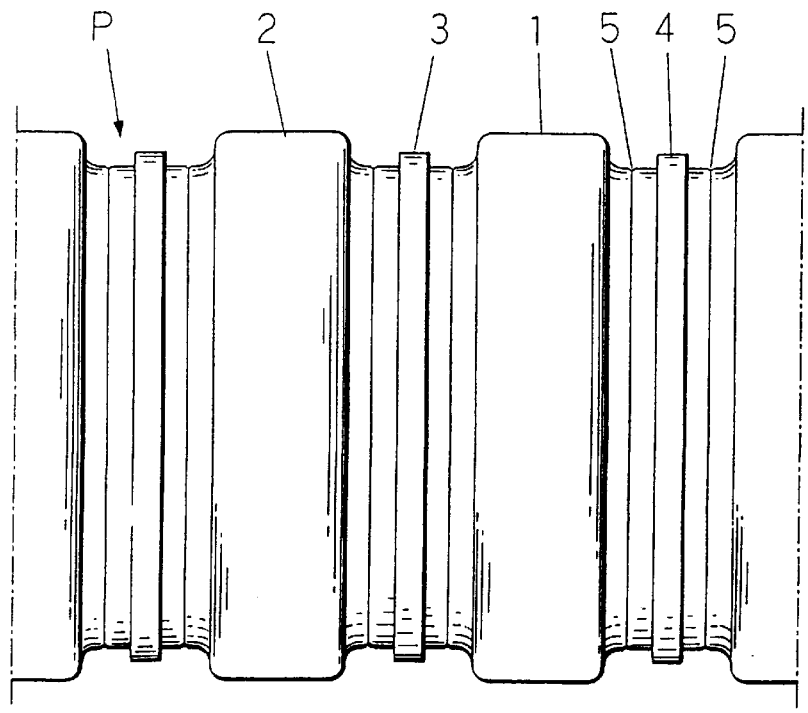
FIG. 13 is a front view showing a pipe according to a further embodiment of the present invention.

FIGS. 12 and 13 show other embodiments of the pipe P according to the present invention. These embodiments are different from the first embodiment as follows. The pipe P shown in FIG. 12 has a structure in which the step portions as cutting marks 5 are formed so as to be inclined in diameter-reducing directions from opposite-side base portions of each of the annular protrusions 4. The pipe P shown in FIG. 13 has a structure in which slits formed in the outer circumferential surfaces of portions to be cut are used as the cutting marks 5.

In the present invention, not only the longitudinal length of each of the circular wall portions 3 varies in accordance with pipe size but also the thickness of the circular wall portion 3 varies in accordance with the purpose of use. Accordingly, as described above, the longitudinal length of each of the annular protrusions 4 is preferably set to be a length which lies in a range of from one third to one sixth as large as the longitudinal length of the circular wall portion 3. If the longitudinal length of the annular protrusion 4 is larger than one third of the longitudinal length of the circular wall portion 3, it becomes difficult to cut the pipe well at a portion thinner than the protrusion 4. As a result, the pipe has to be cut in the thick protrusion 4, so that unnecessarily much labor is required for cutting the pipe. On the other hand, if the longitudinal length of the annular protrusion 4 is smaller than one sixth of the longitudinal length of the circular wall portion 3, and if the external force acts on pipes to disconnect the pipes from each other after the pipes are connected by use of the annular protrusions 4, the connection is difficult to oppose the external force sufficiently. As a result, there is a fear of spoiling watertightness between the pipes, with a risk of losing safety.

Figure 14:
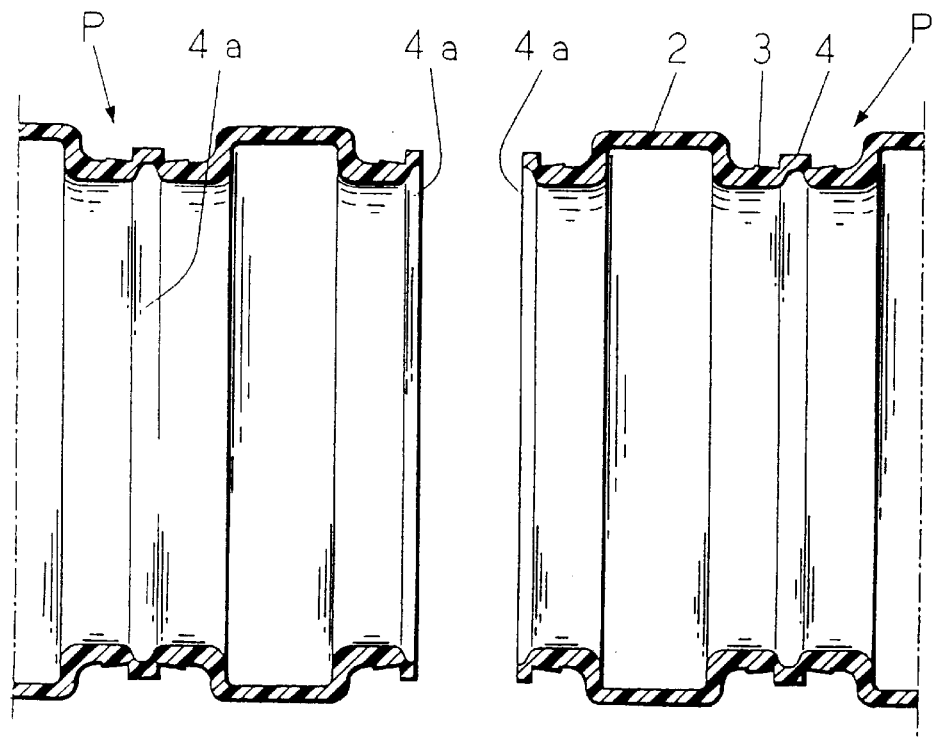
FIG. 14 is a cross-sectional view showing a state in which cut ends of two pipes are made face to face, for reference.
Figure 15:
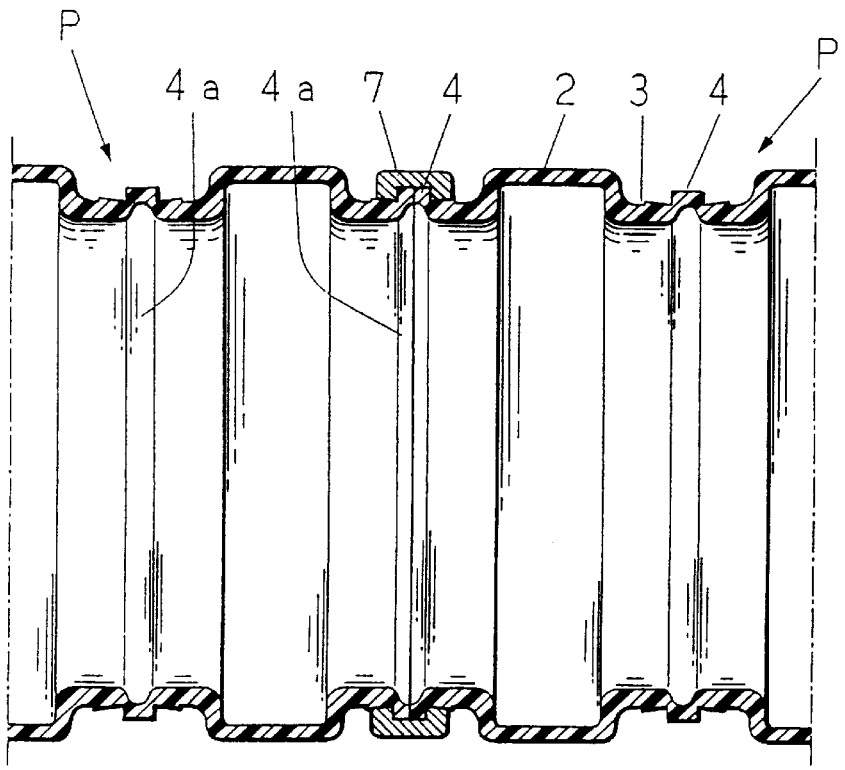
FIG. 15 is a cross-sectional view showing a state of connection of the pipes depicted in FIG. 14.
Figure 16:
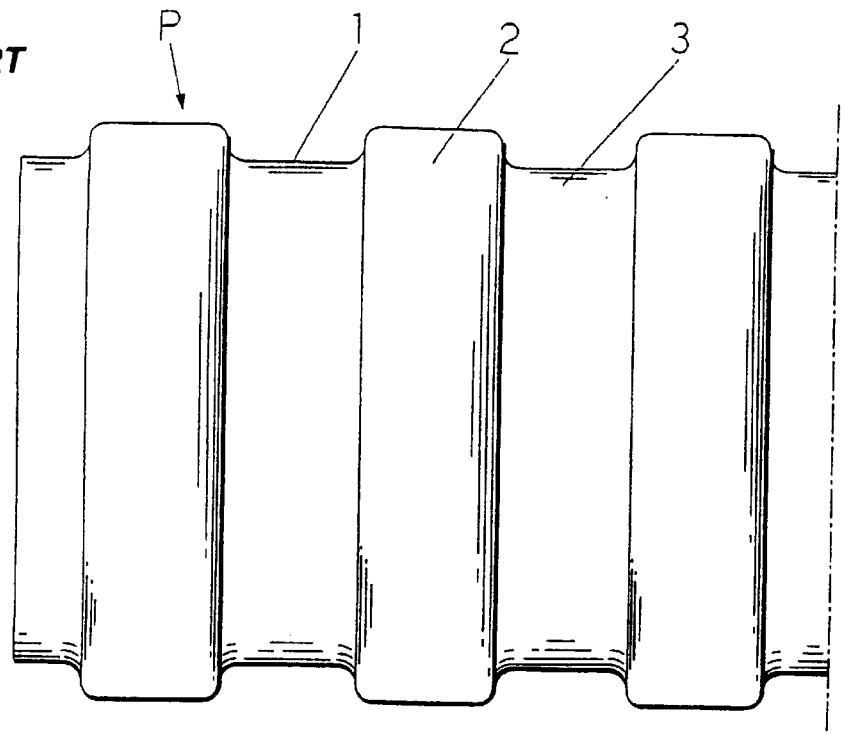
FIG. 16 is a front view showing a pipe according to the conventional.
Figure 17:
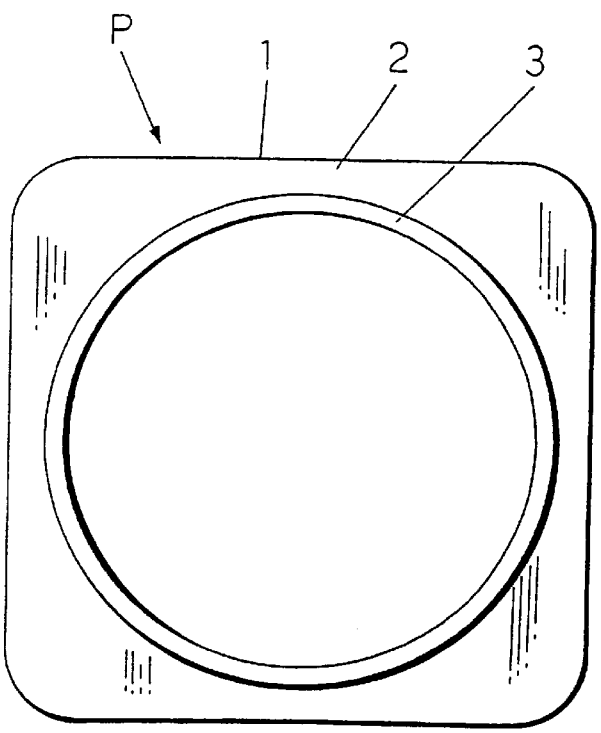
FIG. 17 is a side view of the pipe depicted in FIG. 16.

When, for example, pipes P having a structure as shown in the first embodiment are cut in intermediate positions of the annular protrusions 4 and connected to each other as shown in FIGS. 14 and 15, the longitudinal length of each of the annular protrusions 4 cut thus is small. Particularly when blow molding is made, the thickness of each of the annular protrusions 4 is reduced because sectionally circular arc grooves 4a are formed in the inside of the annular protrusions 4 as described above. Accordingly, after the pipes are connected to each other by means of the pipe joint 7, the connection is difficult to oppose intensive external force acting in pipe-disconnecting directions, so that watertightness between the pipes is apt to be disturbed and there occurs a risk of losing safety. Therefore, taking this risk into consideration carefully, the present invention is designed so that the length of each of the annular protrusions 4 in the longitudinal direction of the pipe is set, as described above, to lie in a range of from one third to one sixth as large as the length of the circular wall portion 3 in the longitudinal direction of the pipe. Further, the pipes are cut substantially in the intermediate positions on sides of the annular protrusions 4 and then made face to face.

Although typical embodiments of the present invention have been described above, it is a matter of course that the present invention is not limited to those embodiments, but modification may be made suitably as long as the constituents for the present invention are included and the object of the present invention and the following effect can be achieved. For example, the shape of the square wall portion 2 may be a general quadrilateral shape or rectangular shape. The shape of the circular wall portion 3 may be a circle, an ellipse, an oblong, an egg-shape, etc.

The present invention is based on Japanese Patent Application No. Hei. 10-176599, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As is obvious from the above description, the present invention is designed for a pipe in which an outer surface shape of a pipe wall formed by arranging sectionally-rectangular-wall portions and sectionally-circular-wall portions alternately in the longitudinal direction of the pipe. Further, the present invention is configured so that each of the sectionally-circular-wall portions has a sectionally U-shaped annular protrusion in the longitudinally center portion. Accordingly, no matter where pipe laying is made, if flat sides of the quadrilateral wall portions are disposed along a wall or floor surface, a moat bottom, or the like, of the pipe-laying place, the pipe can be laid very stably, positioning of the pipe can be made very easily, and the pipe can be laid stably so that the pipe is prevented from easily displacing even after pipe laying. As for connection of pipes to each other, the sectionally U-shaped annular protrusions formed in the longitudinally center portions of the sectionally circular wall portions respectively can be utilized effectively to connect the pipes watertightly.

Further, even in the case where external pull-apart force acts on the pipes in the longitudinal direction of the pipes, the annular protrusions can be set against the external pull-apart force. Accordingly, watertightness at the joint portion of the pipes can be kept securely. Further, the sectionally circular wall portions can be utilized to connect the pipe ends to each other. Accordingly, connecting portions are prevented from being projected largely over the outer circumference because of the increase of the size of the connecting portions like the case where sectionally quadrilateral wall portions are connected to each other. Conclusively, even if the connecting portions exists, there can be expected a unique effect that pipe layout can be made substantially in the same state as parallel pipe layout or stack pipe layout which dose not have any connecting portions.

What is claimed is:

1. A corrugated synthetic resin pipe comprising:

a pipe wall including sectionally rectangular wall portions and sectionally circular wall portions disposed alternately in a longitudinal direction of the pipe, wherein each of said sectionally circular wall portions includes an annular protrusion which projects outward from said sectionally circular wall portions that is disposed substantially at a center of said sectionally circular wall portion between adjacent sectionally rectangular wall portions in the longitudinal direction.

2. The corrugated synthetic resin pipe according to claim 1, wherein said annular protrusion has a U-shaped cross-section taken along the longitudinal direction.

3. A corrugated synthetic resin pipe according to claim 2, wherein each of said sectionally circular wall portions further has an annular shaped cutting mark interposed between said annular protrusion and said sectionally rectangular wall portion, said annular shaped cutting mark being separated away from said annular projected portion by a predetermined distance in the longitudinal direction.

4. A corrugated synthetic resin pipe according to claim 3, wherein a pair of said annular cutting marks are formed between said adjacent sectionally rectangular wall portions in the longitudinal direction.

5. A corrugated synthetic resin pipe according to claim 3, wherein said annular shaped cutting mark comprises a tapered portion inclined relative to an axis of said pipe.

6. A corrugated synthetic resin pipe according to claim 1, wherein said annular protrusion has a length in the longitudinal direction which lies in a range from one third to one sixth as large as a length of said sectionally circular wall portion in the longitudinal direction.

7. A corrugated synthetic resin pipe according to claim 1, wherein a rectangular shape in a cross-section of each of said sectionally rectangular wall portions has rounded corners.

8. A corrugated synthetic resin pipe according to claim 1, wherein a rectangular shape in a cross-section of each of said sectionally rectangular wall portions is square.

9. A corrugated synthetic resin pipe according to claim 1, wherein a circular shape in cross-section of each of said said sectionally circular wall portions is selected from the group consisting of a circle, an ellipse, an oblong and an egg-shape.

10. A corrugated synthetic resin pipe according to claim 1, further comprising an arc groove positioned inside said annular protrusion in the longitudinal direction.

11. A corrugated synthetic resin pipe according to claim 1, further comprising inclined surfaces on opposite sides of said annular protrusion on the outside of said sectionally circular wall portion between adjacent sectionally rectangular wall portions in the longitudinal direction.

12. A corrugated synthetic resin pipe according to claim 11, wherein said inclined surfaces rise outward with slight slopes from opposite-sides of said annular projected portion.

13. A corrugated synthetic resin pipe according to claim 12, wherein said inclined surfaces are formed substantially in intermediate positions between said annular protrusion and side walls of two adjacent square wall portions.

14. A corrugated synthetic resin pipe according to claim 1, further comprising inwardly inclined portions formed substantially in intermediate positions between said annular protrusion and side walls of two adjacent square wall portions.

15. A corrugated synthetic resin pipe according to claim 14, wherein said inwardly inclined portions are diameter-reducing portions.

16. A corrugated synthetic resin pipe according to claim 14, further comprising cutting marks at said inwardly inclined portions.

17. A corrugated synthetic resin pipe according to claim 16, wherein said cutting marks are slits.

\* \* \* \* \*